United States Patent Office 3,493,110
Patented Feb. 3, 1970

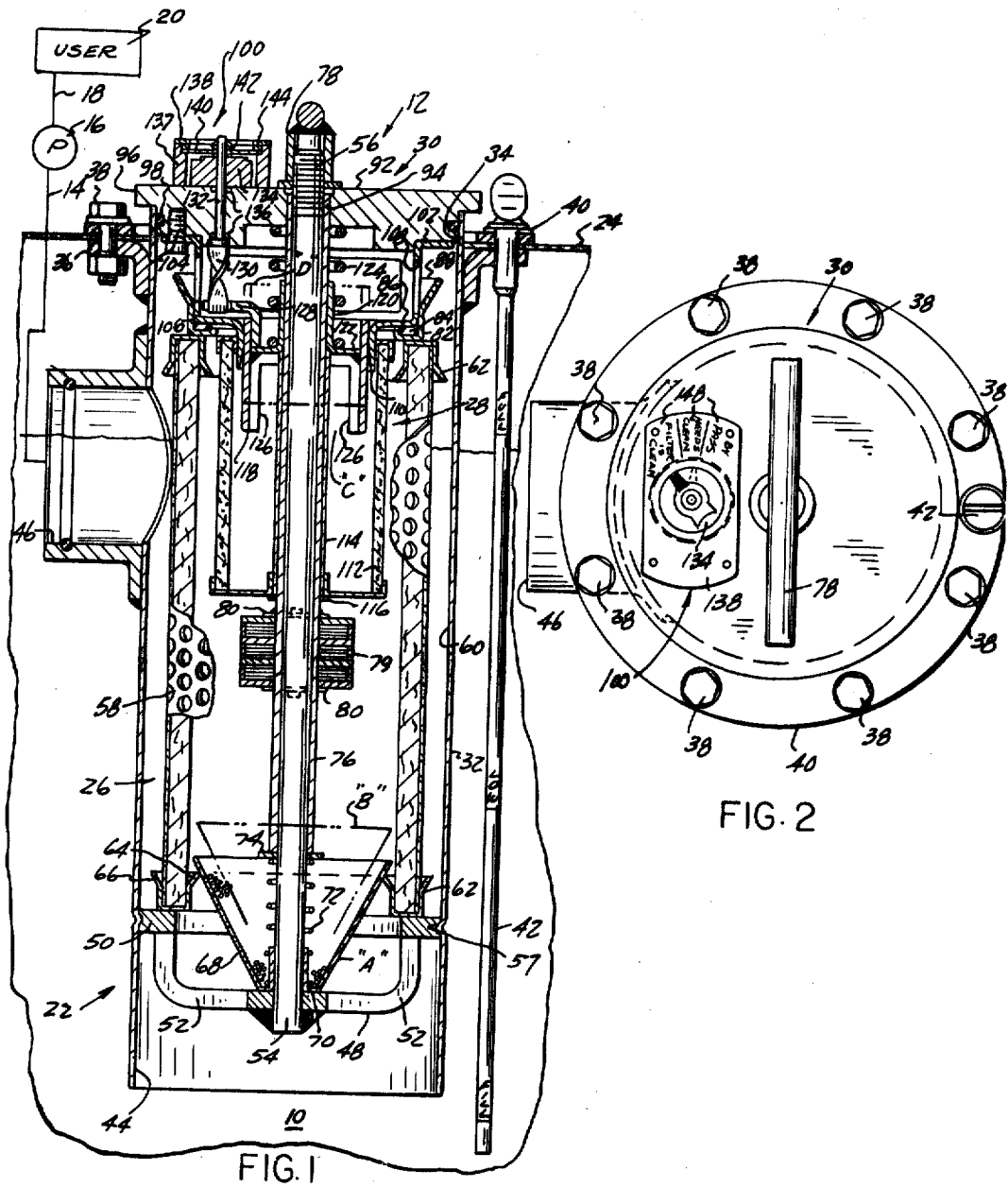

3,493,110
MULTIPLE FILTER DEVICE
Nils O. Rosaen, Bloomfield Hills, Mich., assignor, by mesne assignments, to Parker-Hannifin Corporation, Cleveland, Ohio, a corporation of Ohio
Filed Apr. 24, 1967, Ser. No. 632,962
Int. Cl. B01d *35/28, 35/14*
U.S. Cl. 210—90
18 Claims

ABSTRACT OF THE DISCLOSURE

A housing supports a cylindrical filter element adjacent the filter opening of a fluid reservoir. Fluid in the system normally circulates axially upwardly through the inlet end of the filter and radially through the filter walls. A refill charge of fluid is poured axially downwardly through the cylindrical filter and out the filter inlet in a direction opposite to normal fluid circulation. A conical strainer is supported for axial movement toward and away from the filter inlet and traps foreign matter carried in the refill charge of fluid or which is dislodged from the inner wall of the filter. The strainer is spring-biased toward engagement with a seat formed around the filter inlet and is normally disposed in the path of the fluid system. When the quantity of foreign matter carried in the strainer reduces the upward fluid flow into the filter, a pressure differential created across the strainer lifts the strainer away from its seat to provide a bypass route around the strainer.

BACKGROUND OF THE INVENTION

Field of the invention

The present invention relates to fluid filter devices and more particularly to a device having a cylindrical filter element, means normally circulating the system fluid axially through the inlet end of the filter and radially outwardly through the filter walls, and a conical spring-biased filter element normally seated in the inlet of the cylindrical filter in the normal path of circulation of the system fluid and adapted to trap foreign matter from fluid flowing in a reverse direction through the cylindrical filter inlet.

Description of the prior art

Fluid filter devices are commonly supported within a reservoir of the fluid system and adjacent the filter opening of the system. The filter elements employed in such devices have a cylindrical configuration and means are provided for circulating the system fluid axially into the filter element and radially outwardly through the filter walls. However, it has been found that as the filter element of such devices is removed from the reservoir for purposes of cleaning or a refill charge of fluid is poured through the filter in a reverse direction through the inlet, foreign matter is dislodged from the filter or is carried in the refill fluid into the reservoir. This foreign matter then clogs the filter element upon resumption of the normal fluid circulation through the system. As the foreign matter clogs the filter, the path available to the normal fluid flow is reduced thereby creating serious damage to the pumps or other components of the system. The present invention provides an improvement over such filter devices by providing strainer means effective to collect foreign matter from fluid flowing in a reverse direction through the inlet of a filter element and supported such that a bypass route is opened around the strainer when sufficient foreign matter has been trapped in the strainer to impair the fluid flow through the strainer.

SUMMARY

The preferred embodiment of the present invention, which will be subsequently described in greater detail, contemplates a filter housing mounted adjacent the filler opening of the fluid reservoir. The housing supports a cylindrical element having its upper end adjacent the filter opening and a lower end extending below the fluid level in the reservoir.

Normal fluid circulation is axially upwardly through the lower end of the cylindrical element and radially outwardly in filtering relationship through the filter wall.

A cap assembly which closes off the filler opening has a bypass valve arrangement engaged with the upper end of the main cylindrical filter. An elongated vertical guide rod supported by the housing extends upwardly through the inlet of the main cylindrical filter and through the cap assembly. An elongated sleeve slidably mounted on the guide rod supports a secondary filter element within the upper end of the main filter element. When the main filter element has accumulated sufficient foreign matter on its inner wall surface to impair normal fluid flow, a bypass valve, responsive to the pressure increase created across the filter element moves to open a bypass route from the interior of the main filter element and through the secondary filter element for discharge through the system. Indicating means mounted exteriorly of the cap assembly are operably connected to the bypass valve and provide a visual indication of the filtering condition of the main filter as related to the position of the bypass valve.

When the fluid level in the reservoir has been reduced sufficiently to require a refill charge of fluid, the cap assembly, bypass assembly and secondary filter are separated from the filter housing. The refill charge of fluid is poured through the upper end of the main filter and axially downwardly toward the filter inlet. A frusto-conical strainer mounted on the guide rod is spring-biased toward engagement with the inlet of the main filter. The strainer provides a sediment trap for removing particles of foreign matter carried in the refill charge of fluid. The strainer also provides means for trapping foreign matter dislodged from the interior walls of the main filter element as a result of backwash or the like. As the strainer accumulates foreign particles this accumulation creates an opposition to the normal upward fluid flow through the filter inlet and creates a pressure differential across the strainer. The spring-biased supporting means permits the strainer to unseat axially upwardly and away from the inlet in response to the pressure differential so that a bypass route around the strainer and through the outlet is opened. This novel arrangement permits the system fluid to follow its normal path through the inlet of the filter while at the same time preventing the foreign matter collected by the strainer from escaping. Furthermore the strainer is removable as a unit with the main filter element from the reservoir so that foreign matter dislodged in the removal process is trapped by the strainer.

It is therefore an object of the present invention to improve filter devices employing a filter element having closed configuration and an open inlet end by providing a strainer member removable with the filter element, the strainer normally engaged with the inlet of the filter element when the filter is in an operating condition and arranged to trap foreign matter moving in a reverse direction to normal fluid flow, and pressure responsive means operable to unseat the strainer from the inlet in response to a clogged condition of the strainer so that a bypass route around the strainer and through the filter outlet is opened.

It is another object of the present invention to provide means in a filter device for collecting and removing foreign matter disloged from the inner wall of a cylindrical filter element and movable toward the inlet of the cylindrical filter by providing a conical filter element mounted adjacent the inlet of the cylindrical filter and having a mesh permitting normal fluid flow into the inlet and through the walls of the cylindrical filter in filtering relationship, but effective to accumulate foreign matter from fluid flowing in a reverse direction through the inlet, means supporting the conical filter element for movement between positions corresponding to the clogged condition of the conical filter, and pressure-responsive means operable to separate the conical filter from the inlet of the cylindrical filter element to open a bypass route for normal fluid flow into the cylindrical filter when the conical filter element has become clogged.

A still further object of the present invention is to provide in a filter device the combination comprising a first filter element having a closed filtering wall open at one end; means directing fluid flow through the open end of the first filter element; a second filter element; and means supporting the second filter element for movement toward and away from the open end of the first filter element between a first position wherein the second filter element is engaged with the open end and a second position wherein the second filter element is disengaged from the open end to open a fluid path around the second filter.

A still further object of the present invention is to provide in combination with a fluid filter device mounted adjacent the filler opening of a fluid reservoir, fluid filter means including a cylindrical filter element supported in an upright position with an upper end being adjacent the filler opening and an annular flared section mounted to the upper end of the filter element to form a pouring spout for a recharge quantity of fluid.

A still further object of the present invention is to provide in combination with a fluid filter device having a cylindrical housing, open at one end to define a fluid inlet, and a fluid outlet axially spaced from the fluid inlet; supporting structure fixed adjacent and within the inlet; an elongated guide rod mounted on the supporting structure and extending axially away from the inlet; a filter element mounted on the guide rod adjacent the inlet; and supporting means axially spaced from the supporting structure in a direction away from the inlet, the supporting means retaining the filter element adjacent the inlet.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIGURE 1 is a view of a preferred fluid system with longitudinal sectional view through a filter device illustrating the invention and with other parts of the system illustrated schematically; and FIGURE 2 is a plan view of the filter device of FIGURE 1.

DESCRIPTION OF THE PREFERRED EMBODIMENT

Now referring to the drawings, a preferred fluid system comprises a reservoir 10 having a filter device generally indicated at 12 mounted therein. Fluid from the reservoir 10 is drawn through the filter device 12 and a discharge line 14 by a pump 16 which in turn discharges pressurized fluid through a line 18 to a fluid user 20.

For a detailed description of the filter device 12, the filter device will be considered as a series of sub-assemblies comprising a housing structure 22 mounted to an upper plate 24 of reservoir 10 and which supports a main filter assembly 26, a bypass filter assembly 28 and a cap assembly 30.

Considering first in detail the housing structure 22, the housing structure comprises an elongated, vertically mounted, cylindrical housing member 32 having it upper end extending through a circular aperture 34 formed in the top plate 24. The lower end of the housing 32 extends below the normal level of the fluid in the reservoir 10. An annular flange 36 is fixed adjacent the upper end of the cylindrical housing 32 as by welding or the like and is mounted by threaded fasteners 38 on the underside of the top plate 24. The fasteners 38 also retain an annular ring 40 on the upper surface of the top plate 24. The annular ring 40, the top plate 24 and the flange 36 are apertured to receive an elongated lipstick 42 which extends downwardly into the reservoir 10 and adjacent the housing 32. The dipstick 42 has suitable indicia to provide visual means for indicating the fluid level within the reservoir 10.

The lower end of the housing 32 is open to provide an inlet 44. A short tubular member provides a lateral outlet 46 from the housing 32 and is connected to the discharge line 14.

A dished section 48 having an annular portion 50 is attached to the interior of the housing 32 adjacent the inlet 44. The dished section 48 has a plurality of annularly spaced apertures 52 to permit fluid flow upwardly from the inlet 44.

An elongated vertical guide rod 54 having its lower end fixed to the dished section 52 extends axially upwardly through the housing 32. An upper threaded portion 56 of guide rod 54 extends above the upper end of the housing 32.

The housing 32 is preferably formed of a tubular section which is rolled to a reduced diameter at 57 with the annular portion 50 held in place. This method of joining the portion 50 to the housing 32 provides an annular fluid-tight seal between the two members and provides a joint capable of withstanding axial and torsional forces applied to the guide rod 54.

The main filter assembly 26 comprises a conventional cylindrical filter element 58 having a side wall formed of a suitable porous filtering material. The filter element 58 is seated on annular portion 50 and has a length such that its upper end extends above the outlet 46. The diameter of the filter element 58 is smaller than the diameter of the wall of housing 32 so that an annular chamber 60 is formed between the filter element 58 and the housing 32.

The filter element 58 has an annular retainer element 62 attached to each of its open ends. Each retainer element 62 has a substantially U-shaped cross section with its extreme edges flared away from the walls of the filter element as at 64 and 66.

The main filter assembly 26 also includes a frusto-conical, perforated strainer 68 which is slidably mounted on the guide rod 54. The strainer 68 functions as a secondary filter and is intended to collect foreign matter having a greater particle size than is normally collected by the filter element 58. Thus, the perforations of the strainer 68 permit the unfiltered fluid to pass from the inlet 44 upwardly to the interior of the filter element 58 without removing the contaminants carried therein which are normally accumulated by the filter element 58.

The strainer 68 has a bushing 70 which closes off the lower narrow end of the element 68, is slidably mounted on the rod 54 and provides an abutment for seating the element 68 on the dished section 48.

The upper end of the strainer 68 is open and has a diameter greater than the inner peripheral edge of the flared portion 64 and slightly less than the inner diameter of the wall of the filter element 58. The strainer 68 is movable on guide rod 54 between a lower position A wherein the wall of the strainer 68 is seated on the peripheral edge of the flared portion 64 and a raised position indicated in phantom at B wherein the wall of the strainer 68 is spaced from its seated position so that an annular bypass route between the strainer 68 and the inner surface of the filter element 58 is opened.

The strainer 68 is normally biased toward the lower seated position A by a cylindrical spring element 72 having its lower end seated in the bushing 70 and its upper end reacting against a retainer section 74 carried at the lower end of a tubular member 76.

The tubular member 76 is slidably mounted on the guide rod 54 and has its upper end engaged by a handle section 78 which is engaged with the threaded portion 56 of the rod 54. The spring 72 has a resilience which normally urges the strainer 68 towards its seated position A, but permits the strainer 68 to be unseated when a pressure differential created across the upper and lower surfaces of the wall of the strainer 68 develops a predetermined upward force against the bias of the spring 72.

The tubular member 76 carries a permanent magnet unit 79 which is held in place within the interior of the filter element 58 by a pair of snap rings 80. The magnetic unit 79 comprises a series of magnets arranged to separate magnetically attractive particles from the system fluid as it passes through the interior of the filter element 58.

The main filter assembly 26 also includes an annular member 82 attached to the upper open end of the filter element 58 and which carries an annular seal element 84. The seal element 84 has an open upwardly directed seating surface 86. The upward extreme edge 88 of the member 82 is flared outwardly to form a pouring spout.

The cap assembly 30 comprises a cap member 92 having a central aperture 94 for receiving the guide rod 54 and the tubular member 76. The cap 92 closes off the upper end of the housing 32 and has an annular flange 96 seated on the upper end of the cylindrical housing 32. An annular seal 98 carried by the cap 92 abuts the inner surface of the cylindrical housing adjacent its upper end so that a fluid tight seal is provided at the upper end of the housing 32. The cap 92 is locked in place by the handle section 78, the lower surface of the handle section 78 abuting the upper surface of the cap 92. The cap 92 also supports a visual indicating means 100 which will be subsequently described in greater detail.

The bypass filter assembly 28 is attached to the cap 92 and is normally removed and inserted as a unit with the cap 92. The bypass filter assembly comprises an annular retainer 102 attached to the under surface of the cap 92 by a series of threaded fasteners 104 and extends downwardly into the housing 32. An annular shoulder 106 of the retainer 102 is seated on the surface 86 of seal 84. The retainer 102 has a series of annularly spaced apertures 108 providing communication between the interior and exterior portions of the retainer 102. Thus it is to be understood that there is fluid communication between the interior of the retainer 102 and the annular chamber 60. The annular shoulder 106 abuts the base of the flared portion 88 of the annular member 82 so that the filter 58 is located with respect to its annular seat 50.

The retainer 102 has a lower cylindrical end 110 fixed to a cylindrical bypass filter element 112. The filter element 112 has a diameter smaller than the inner wall of the main filter element 58. The bypass filter element 112 has a length of approximately one half the length of the main filter element 58 and carries a sleeve 114 which is received by the guide rod 54. The lower edge of the sleeve 114 is seated against a retainer element 116 which is carried by the tubular member 76. Thus it can be seen that when the cap 92 is inserted on the rod 54 and seated in position, that the bypass filter 112 is disposed coaxially with the main filter element 58 and adjacent the upper end of the main filter 58.

A cylindrical bypass valve 118 is slidably engaged with the cylindrical section 110 of the retainer 102 and has an upper tubular section 120 axially slidably engaged with the tubular section 76. The tubular section 120 terminates in an annular wall portion 122 which closes fluid communication between the upper and lower portions of valve 118. The wall portion 122 also functions as a seat for the lower end of cylindrical spring member 124. The upper end of the spring 124 acts against the cap 92 so that the bypass valve 118 is biased toward a lower closed position illustrated at C wherein it is seated on the upper end of sleeve 114. In the closed position, the bypass valve 118 closes off fluid communication between the interior of the main filter element 58 and the interior of the retainer 102.

A plurality of axially directed annularly spaced apertures 126 extending upwardly from the lower edge of the valve 118 and toward the upper wall portion 122. The bypass valve 118 is movable upwardly in response to a force opposing the bias of the spring 124 toward a bypass position D indicated in phantom wherein the apertures 126 clear the upper edge of the cylindrical portion 110 so that fluid communication between the interior of the filter element 58 and the bypass filter element 112 is opened into the interior of the retainer 102 and then radially outwardly to the chamber 60.

The axial movement of the bypass valve 118 is indicated by the indicator means 100. A slotted member 128 carried at the upper end of the bypass valve 118 engages an actuator member 130 which is supported for rotation by a pin 132. The actuator member 130 comprises an elongated flat strip having a uniform longitudinal twist so that linear axial movement of the arm 128 rotates the pin 132. The pin 132 is supported for rotation in the cap 92 with its upper end extending above the surface of the cap 92 and supporting a pointer member 134. A pair of seal members 136 provide a fluid tight seal between the pin 132 and the cap 92.

A closed hollow boss 137 encloses the pointer element 134 and supports an indicia plate 138 above the pointer element 134. A transparent disk-shaped secondary pointer element 140 is rotatably supported on a bushing 142 and is biased by an annular spring 144 toward an annular seat 146 of the boss 136. The pointer element 134 and the transparent pointer element 140 have a pair of interengageable abutments arranged such that when the pointer 134 is rotated in a clockwise direction as viewed in FIGURE 2, the transparent pointer 140 and the pointer 134 rotate together; however when the pointer 134 rotates in a counter clockwise position, the transparent pointer 140 is maintained in its clockwise position to thereby serve as a memory device.

OPERATION

Normal operation of the filter device is with the strainer 68 in its seated position A so that all the fluid passing through the inlet 44 of the housing enters axially through the lower end of the main filter element 58 and through the strainer 68. The bypass valve 118 is in its lowered seated position indicated at C so that fluid communication between the interior of the filter element 58 and the interior chamber of the retainer portion 102 is closed off. Thus the normal fluid flow is axially through the strainer 68, into the interior of the filter element 58, and then radially outwardly to the annular chamber 60 where the filtered fluid is discharged through the outlet 46. This normal fluid path assumes that the strainer 68 and the main filter 58 are in an unclogged condition.

When the strainer 68 has accumulated a collection of foreign matter on its lower concave surface, this collection of foreign matter will tend to close off the upward fluid flow through strainer 68. As fluid flow through the strainer 68 is reduced, a pressure differential is created across the upper and lower surfaces of strainer 68 which develops an upward force acting on the strainer and against the downward bias of the spring 72. As this pressure differential increases, the strainer 68 is unseated and moves upwardly toward position B. Thus an annular bypass route is opened from the inlet 44 and between the flared seat 64 and the wall of the strainer 68.

It is to be noted that the movement of the strainer 68 is independent of the filtering condition of the main filter element 58 and dependent only on its own clogged condition.

The bypass valve 118 is movable between its lower position C and its bypass position illustrated at D, these positions being dependent on the filtering condition of the element 58. Normally fluid flow is radially outwardly through the wall of the element 58 and through the annular chamber 60 when the filter element 58 is in a relatively unclogged condition. However as the filter element 58 accumulates foreign matter, a pressure differential is created between its interior and exterior sides which is reflected across the wall portion 122 of the bypass valve 118. As the filter element 58 becomes a clogged a net force is created on the lower surface of the wall 122 acting axially upwardly against the bias of the spring 124. The spring 124 is chosen with an elasticity such that it permits the valve 118 to move axially upwardly toward the bypass position D wherein the apertures 126 register with the interior of the retainer 102 to open a bypass route. This bypass route permits fluid from within the interior of the element 58 to flow through the walls of the bypass filter 112, upwardly through the bypass valve 118 and through the apertures 108 of the retainer 102 and radially outwardly to the annular chamber 60 for discharge through the outlet 46.

As the bypass valve 118 moves from its normal position C to its bypass position D, the pointer element 134 of the indicator means 110 is rotated to positions wherein it registers with the indicia 148 associated with the filtering condition of the element 58 so that the operator has visual means indicating whether or not the filter element 58 requires cleaning or replacement. The transparent pointer element 140 provides means for indicating whether or not the pointer 134 has been rotated by the bypass valve 118 when the fluid pressure within the system has been terminated so that the bypass valve 118 has returned to its normal position C.

When it is necessary to remove the cap 92 in order to clean or replace the main filter 58 or to replenish the fluid within the reservoir 10, the handle section 78 is disengaged from the guide rod 54 and the cap assembly 30 and the bypass assembly 28 removed as a unit from the housing 32 while permitting the main filter assembly 58 including the strainer 68 to remain in place. The replenishment quantity of fluid is poured axially through the filter element 58 and downwardly through the strainer 68 wherein relatively large particles of foreign matter are separated from the refill charge of fluid before it is mixed with the fluid in the reservoir 10. When the filter element is to be cleaned or replaced with the cap 30 and the bypass assembly is separated from the filter housing 32, the tubular member 76 is drawn axially upwardly and separated from the guide rod 54. The filter element 58 is then withdrawn axially upwardly from within the reservoir 10. It can be seen that as the filter element 58 is removed from the reservoir 10, that the strainer 68 is also removed so that the two elements are removed as a unit. Thus any accumulations of foreign matter that are dislodged from the inner wall surface of the element 58 will fall downwardly for collection by the strainer 68, thereby eliminating the possibility of contaminants falling back into the reservoir 10.

Having thus described my invention I now claim:

1. In a fluid system having a fluid reservoir, said reservoir having an opening disposed above the level of fluid therein, a filter device comprising:

a housing disposed within said reservoir and having a cylindrical filter chamber and an inlet and an outlet open to said chamber, said housing being further provided with an upper opening registering with said filter chamber;

means carried by said reservoir for supporting said housing in said reservoir opening with said inlet disposed below the fluid level in said reservoir;

a filter assembly carried by said housing and including a cylindrical filter element having a lower open end in registry with said inlet and being spaced from a portion of the housing wall defining said filter chamber to define a substantially annular outlet chamber communicating with said outlet;

a cover member secured to the reservoir top wall for closing said reservoir opening and means carried by said cover member to normally close the upper end of said filter element and removable with said cover member to permit the introduction of a replenishing quantity of fluid through the interior of said filter element and into said reservoir; and a second filter element carried within said first mentioned filter element and movable between a position extending across the lower open end of said first mentioned filter element to filter fluid introduced into said reservoir through said upper opening and a position spaced inwardly from said lower open end of said first mentioned filter element so as to not interfere with fluid flow from said reservoir through said open lower end, said second filter element being constructed and arranged to collect foreign matter dislodged from said first filter element during backwash of said first filter element.

2. The filter device as defined in claim 1, wherein said first and second filter elements each have a different filtering mesh for removing foreign matter of different particle sizes.

3. The filter device as defined in claim 1, including means normally biasing said second filter element into engagement with the open end of said first filter element.

4. The filter device as defined in claim 1, including guide means supporting said second filter element for movement in directions corresponding to the fluid flow through said open end, means biasing said second filter element toward engagement with said open end and pressure means responsive to a partially clogged condition of said second filter element to move said second filter element from said first position towards said second position.

5. The filter device as defined in claim 4, wherein said second filter element accumulates foreign matter from fluid directed through said open end in said second opposite direction, said accumulated foreign matter providing an opposition to fluid flow in said first direction, and said pressure means being operable to move said second filter from said first position towards said second position to open a bypass path around said second filter element.

6. The filter device as defined in claim 5, wherein said first filter element has a cylindrical side wall formed symmetrically around an axis, and including means defining a continuous seat adjacent the open end of said first filter element, said guide means supporting said second filter element for movement along said axis between positions wherein said second filter element is engaged and disengaged with said continuous seat.

7. The filter device as defined in claim 6, wherein said second filter element has a closed filtering wall, open at one end and fluidly closed at the end opposite to said one end.

8. The filter device as defined in claim 7, wherein said continuous seat is symmetrical about said axis, and said second filter element is symmetrical about said axis, the open end of said second filter element having a diameter greater than the diameter of said continuous seat and the closed end of said second filter element having a diameter less than the diameter of said continuous seat so that a section of the side wall of said second filter element between said open and closed ends abuts said seat when said second filter element is engaged with the open end of said first filter element.

9. The combination as defined in claim 1 and including pressure responsive means operable to move said second filter element from said first mentioned position to said second mentioned position upon a predetermined pressure differential being produced across said second filter element by fluid flow from said reservoir through said open lower end of said first mentioned filter element.

10. The combination as defined in claim 1 and including a rod extending into said first mentioned filter element and said second filter element being slidably mounted on said rod.

11. The filter device as defined in claim 1, including a third filter element and means responsive to a clogged condition of said first filter element to open a bypass route from the interior of said first filter element and through said third filter element.

12. The filter device as defined in claim 11, including a member movable from an initial position to positions corresponding to the clogged condition of said first filter element, said member being operably connected to said bypass opening means and further including read-out means providing a visual indication exteriorly of said reservoir of the condition of said first filter element, said read-out means being operably connected to said movable member.

13. In a fluid filter device, the combination comprising:

a first filter element having a closed filtering wall open at one end;

means directing fluid flow through the open end of said first filter element;

a second filter element;

means supporting said second filter element for movement toward and away from the open end of said first filter element between a first position wherein said second filter element is engaged with said open end and a second position wherein said second filter element is disengaged from said open end to open a fluid path around said second filter element;

said first filter element being arranged in the fluid path of fluid flowing through said open end in a first direction and said second filter element being arranged in the path of fluid flowing through said open end in a second direction, opposite to said first direction when said second filter is engaged with the open end of said first filter element;

guide means supporting said second filter element for movement in directions corresponding to the fluid flow through said open end, means biasing said second filter element toward engagement with said open end and pressure means responsive to a partially clogged condition of said second filter element to move said second filter element from said first position towards said second position;

said second filter element accumulates foreign matter from fluid directed through said open end in said second opposite direction, said accumulated foreign matter providing an opposition to fluid flow in said first direction, and said pressure means being operable to move said second filter from said first position towards said second position to open a bypass path around said second filter element;

said first filter element having a cylindrical side wall formed symmetrically around an axis and including means defining a continuous seat adjacent the open end of said first filter element, said guide means supporting said second filter element for movement along said axis between positions wherein said second filter element is engaged and disengaged with said continuous seat;

said continuous seat and said second filter element being symmetrical about said axis, said second filter having an open end facing the closed end of said first filter element and an opposite closed end, the open end of said second filter element having a diameter greater than the diameter of said continuous seat and the closed end of said second filter element having a diameter less than the diameter of said continuous seat and being regularly enlarged from said closed end to said open end to form a frusto-conical shaped element so that a section of the side wall of said second filter element between said open and closed ends abuts said seat when said second filter element is engaged with the open end of said first filter element.

14. The filter device as defined in claim 1, wherein said second filter element is regularly enlarged in the direction corresponding to the fluid flow in the first direction and forms a trap for collecting foreign particles from fluid flowing in the second opposite direction.

15. The fluid filter as defined in claim 14, wherein the fluid flowing through said open end flows axially into said first filter element.

16. The fluid filter device as defined in claim 15, including means for supporting said first and second filter elements within a fluid reservoir, said support means permitting removal of said first and second filter elements as a unit by a movement along said axis.

17. The fluid filter device as defined in claim 16, wherein said first mentioned fluid directing means normally direct fluid axially through said open end and into said first filter element and said reservoir includes means permitting a refill quantity of fluid to be discharged axially through said first filter element and through said open end in said second opposite direction so that said second filter element removes foreign matter from said refill quantity of fluid.

18. The fluid filter device as defined in claim 17, wherein the foreign matter collected from the fluid flowing in said first direction is accumulated on the interior wall of said first filter element, and said second filter element traps said accumulated foreign matter falling from said first filter element when said first filter element is withdrawn from said reservoir in an axial direction corresponding to the direction of said first fluid flow.

References Cited

UNITED STATES PATENTS

| | | | |
|---|---|---|---|
| 1,563,904 | 12/1925 | Kerckhoff et al. | 210—315 |
| 2,969,019 | 1/1961 | Lorenz et al. | 210—131 X |
| 3,056,499 | 10/1962 | Liddell | 210—82 X |
| 3,288,291 | 11/1966 | Rosaen | 210—131 X |

SAMIH N. ZAHARNA, Primary Examiner

U.S. Cl. X.R.

210—131, 172

PO-1050
(5/69)

UNITED STATES PATENT OFFICE
CERTIFICATE OF CORRECTION

Patent No. 3,493,110      Dated February 3, 1970

Inventor(s) N. O. Rosaen

It is certified that error appears in the above-identified patent and that said Letters Patent are hereby corrected as shown below:

Col. 2, line 4, "filter" to --filler--;

Col. 2, line 68, "disloged" should be --dislodged--;

Col. 3, line 74 "it" should be --its--;

Col. 4, line 9, "lipstick" should be --dipstick--;

Col. 6, line 8, "extending" should be --extend--;

Col. 7, line 11, following "becomes" delete --a--;

Col. 8, line 5, "reservoir" should be --upper--;

Col. 8, line 13, delete "backwash of said first filter element" and insert --fluid flow through said first filter element from said opening--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,493,110      Dated February 3, 1970

Inventor(s) N. O. Rosaen

It is certified that error appears in the above-identified patent and that said Letters Patent are hereby corrected as shown below:

Column 8, line 4, delete "secured to the reservoir top wall".

SIGNED AND SEALED

OCT 27 1970

(SEAL)
Attest:

Edward M. Fletcher, Jr.
Attesting Officer

WILLIAM E. SCHUYLER, JR.
Commissioner of Patents